United States Patent [19]

Rye et al.

[11] 4,124,425

[45] Nov. 7, 1978

[54] METHOD OF MAINTAINING TIRE CORDS IN PARALLEL ARRAY FOR CALENDERING WITH ELASTOMERIC MATERIAL

[75] Inventors: Grover W. Rye, Cuyahoga Falls; Richard L. Bell, North Canton, both of Ohio

[73] Assignee: The Goodyear Tire & Rubber Company, Akron, Ohio

[21] Appl. No.: 801,665

[22] Filed: May 31, 1977

Related U.S. Application Data

[63] Continuation of Ser. No. 405,246, Oct. 10, 1973, abandoned.

[51] Int. Cl.² .............................................. B29H 9/04
[52] U.S. Cl. .................................... 156/168; 156/178; 156/249; 156/433; 156/437; 264/271
[58] Field of Search ................ 156/168, 176, 178–181, 156/230, 235, 237, 238, 247, 249, 278, 324, 433, 435–437, 540, 549, 344, 584; 427/154, 180; 264/257, 271

[56] References Cited

U.S. PATENT DOCUMENTS

| 1,952,468 | 3/1934 | Smith | 156/238 |
|---|---|---|---|
| 2,038,328 | 4/1936 | Wells | 156/168 |
| 2,344,457 | 3/1944 | Christ | 156/176 |
| 2,485,725 | 10/1949 | Francis | 156/238 |
| 2,561,781 | 7/1951 | Bruce | 156/247 |
| 3,239,396 | 3/1966 | Bohannon | 156/436 |
| 3,553,065 | 1/1971 | Stumpt et al. | 156/249 |
| 3,810,805 | 5/1974 | Goldsworthy et al. | 156/361 |

*Primary Examiner*—John E. Kittle
*Attorney, Agent, or Firm*—R. S. Washburn

[57] ABSTRACT

A method, other than weaving, for maintaining cords in parallel array for further processing as by calendering with elastomeric material, such as natural or synthetic rubber, to form strips or sheets of rubberized cords used in building tires, belts, and other rubber products requiring reinforcement cords. The cords are first placed in parallel array and then contacted with a piece of backing material faced with an adhesive for holding the cords parallel on the material. The backing material and attached cords are then removed to a calender where the cords are embedded in the elastomeric material.

5 Claims, No Drawings

METHOD OF MAINTAINING TIRE CORDS IN PARALLEL ARRAY FOR CALENDERING WITH ELASTOMERIC MATERIAL

This is a continuation of application Ser. No. 405,246 filed Oct. 10, 1973, now abandoned.

BACKGROUND OF THE INVENTION

The invention is designed as an alternate method to weaving, as a means for maintaining a plurality of cords in parallel array until used, for example, as backing for carpets, or as reinforcements for rubber products. The invention is particularly well suited for use in forming sheets of rubberized metal cords for reinforcing pneumatic tires and, therefore, will be described in relation to calendering such cords with rubber material used in the production of tires. At present, special machinery is employed for perfoming this particular operation. It would be more economical and desirable, from a production standpoint, if conventional calenders could be used for embedding metal tire cords in the rubber material. This invention is directed to accomplishing this.

Briefly stated, the invention is in a method, other than weaving, for maintaining a number of textile or metal cords in parallel array. The method comprises placing a plurality of cords in parallel array, contacting the parallel cords with backing material, and interposing an adhesive between the cords and backing material to hold the cords parallel on the backing material. The backing material and attached cords can be reeled onto a shell for more convenient handling in transporting the cords to other equipment for further processing.

DESCRIPTION OF THE INVENTION

A number of tire cords, e.g. brass-coated cabled steel cords, are guided from a conventional creel into parallel array and contact with a sheet of backing material which has at least one face covered with a suitable cement or adhesive having sufficient adhesive strength for holding the cords to the backing sheet at a desired end count or parallel spacing.

A good, reusable backing material for the metal tire cords is a rubberized textile fabric made by calendering a cotton, rayon, or nylon cord fabric with unvulcanized rubber material and then heating the coated fabric to vulcanize the rubber material which is soft and pliable for receiving and partially surrounding the metal tire cords. This rubberized fabric is then treated with a contact-type cement or adhesive to which the metal cords immediately adhere upon contacting. Thus, the metal cords become firmly anchored and embedded in the adhesive-faced, soft rubber coating of the textile fabric. The piece of backing material and attached metal cords are spirally wound into a roll for removal to a conventional calender where the metal cords are embedded in rubber material used in the production of tires. The backing material is removed, or separated, from the metal cords during the calendering operation in one of two ways. In the first method, the backing material and attached metal cords are contacted with a first layer of rubber material to partially embed the metal cords. The backing material is then separated from the metal cords, prior to contacting the partially embedded metal cords with a second layer of rubber material which completely surrounds and embeds the metal cords. Using this method, it was found that the backing sheet resisted any change in the placement of the metal cords, resulting in an improved end count of the rubber-coated metal cords. The second method involves separating the backing material from the metal cords just prior to passing the metal cords through calender rolls where the metal cords are successively contacted with two layers of rubber material to cover and embed the metal cords. The used backing material, after separation from the metal cords, can be scrapped, or rewound for recycling and reuse. Another good backing material is a Scotch brand adhesive tape which readily adheres to the metal.

The invention, as indicated, is also applicable to maintaining textile as well as metal tire cords in parallel array. A particularly good backing material for rayon, nylon, or polyester cords was found to be ordinary cotton scrim composed of lightweight cotton threads which extend in both the warp and weft directions and are spaced from one-sixteenth to one-half inches apart. The cotton scrim can be permanently bonded, or cemented to the parallel textile cords and has proven effective in maintaining the textile tire cords parallel during further processing as, for example, their treatment with an agent for promoting the bond between the textile cords and the rubber material of the tire.

The contact cement, or adhesive interposed between the backing material and textile or metal cords, should be chemically compatible with the cords to insure that there is no loss of adhesive with the rubber material, or other detrimental effects to the cords such as the promotion of corrosion of the metal cords.

Thus, there has been described a method which enables the use of existing calenders for embedding metal tire cords in rubber material used in the production of tires.

What is claimed is:

1. The method of preparing rubber article reinforcing wire or textile cords for embedment in unvulcanized rubber material by calendering, comprising gathering a moving plurality of independent separate individual cabled reinforcing cords from a conventional creel to form a moving array of parallel cords spaced to provide a desired end count, wherein said cords extend parallel to the direction of movement of the array, providing backing means in longitudinally continuous running length sheet form, coating said backing means with an adhesive cement compatible with said cords, bringing said array and the so-coated backing means into mutually adherent contact while said cement remains adhesive, said backing means providing the sole means for holding said cords in said desired end count, winding on a winding shell said array of cords together with said backing means, and thereafter conducting the array and backing means together from said shell in a direction parallel to said direction of movement to rubber material calendering means and calendering said unvulcanized rubber material on said cords, and progressively removing said backing means with said cement thereon from said array immediately before said array enters the calendering means, receiving the array of cords embedded in uncured rubber material and incorporating the so calendered array in a reinforced rubber article.

2. A method as claimed in claim 1 wherein said backing means in sheet form comprises a rubberized woven fabric having a covering on at least one side of a soft vulcanized rubber capable of conforming to said cords.

3. A method as claimed in claim 1, wherein said backing means in sheet form comprises a continuous impervious surface.

4. A method as claimed in claim 1, wherein said backing means extends continuously laterally at least the full width of said web.

5. A method as claimed in claim 1, further comprising bringing one side of said web of cords into contact with a first layer of said gum at said calendering means and then removing said backing means immediately prior to contacting the other side of the web with a second layer of said gum.

* * * * *